United States Patent [19]
Grigo et al.

[11] Patent Number: 5,100,960
[45] Date of Patent: Mar. 31, 1992

[54] THERMOPLASTIC MOLDING COMPOSITIONS OF A POLYSILOXANE BLOCK COPOLYCARBONATE AND A POLYCARBONATE BASED ON CERTAIN DIHYDROXYDIPHENYLCYCLOALKANES

[75] Inventors: Ulrich Grigo, Kempen; Peter Horlacher, Senden; Dieter Freitag; Karsten-Josef Idel, both of Krefeld; Uwe Westeppe, Mettmann; Wolfgang Beer; Werner Nouvertné, both of Krefeld, all of Fed. Rep. of Germany

[73] Assignee: Bayer Aktiengesellschaft, Leverkusen, Fed. Rep. of Germany

[21] Appl. No.: 493,036

[22] Filed: Mar. 12, 1990

[30] Foreign Application Priority Data

Mar. 15, 1989 [DE] Fed. Rep. of Germany ....... 3908447

[51] Int. Cl.$^5$ .................. C08L 83/10; C08L 23/16
[52] U.S. Cl. ..................... 525/92; 525/67; 525/100; 525/101; 525/146; 525/147; 525/464
[58] Field of Search ............ 525/67, 92, 100, 464, 525/101, 146, 147

[56] References Cited

U.S. PATENT DOCUMENTS

| | | | |
|---|---|---|---|
| 4,224,215 | 9/1980 | Macke | 260/37 PC |
| 4,804,708 | 2/1989 | Wittmann et al. | 525/67 |
| 4,982,014 | 1/1991 | Freitag | 568/721 |

FOREIGN PATENT DOCUMENTS

| | | | |
|---|---|---|---|
| 0248308 | 12/1987 | European Pat. Off. | 525/67 |
| 285984 | 10/1988 | European Pat. Off. | |

OTHER PUBLICATIONS

International Polymer Science & Technology, vol. 11, No. 2, 1984, E. B. Trostyanskaya et al., "A blend of polycarbonate and polydimethylsiloxane stabilized with poly-block copolymers".

*Primary Examiner*—John C. Bleutge
*Assistant Examiner*—R. Dean, Jr.
*Attorney, Agent, or Firm*—Joseph C. Gil; Richard E. L. Henderson

[57] ABSTRACT

The invention relates to a thermoplastic molding composition comprising
(A) from 10 to 98 parts by weight of a polydiorganosiloxane-polycarbonate block copolymer having a weight average molecular weight of from 10,000 to 200,000 and containing from 75 to 97.5 wt. % of aromatic carbonate structural units and from 25 to 2.5 wt. % of polydiorganosiloxane structural units;
(B) from 2 to 90 parts by weight of a thermoplastic, aromatic polycarbonate having a weight average molecular weight of at least 10,000, and containing bifunctional carbonate structural units corresponding to

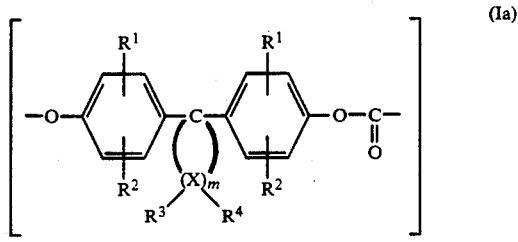

(Ia)

wherein
$R^1$ and $R^2$ independently represent hydrogen, halogen, $C_1$–$C_8$ alkyl, $C_5$–$C_6$ cycloalkyl, $C_6$–$C_{10}$ aryl or $C_7$–$C_{12}$ aralkyl;
m represents an integer of from 4 to 7,
$R^3$ and $R^4$, which may be selected individually for each X, independently represent hydrogen or $C_1$–$C_6$ alkyl; and
x represents carbon,
with the proviso that, on at least one atom X, $R^3$ and $R^4$ both represent alkyl; and
(C) from 0.5 to 30 parts by weight of a rubber having a glass transition temperature of less than $-20°$ C.

The composition of the invention is useful for the preparation of injection molded articles having an excellent surface and a particularly good toughness at low temperatures.

1 Claim, No Drawings

THERMOPLASTIC MOLDING COMPOSITIONS OF A POLYSILOXANE BLOCK COPOLYCARBONATE AND A POLYCARBONATE BASED ON CERTAIN DIHYDROXYDIPHENYLCYCLOALKANES

FIELD OF THE INVENTION

The invention relates to thermoplastic molding compositions and more particularly to compositions comprising a polysiloxane copolycarbonate.

SUMMARY OF THE INVENTION

The invention relates to a thermoplastic molding composition comprising (A) from 10 to 98 parts by weight of a polydiorganosiloxane-polycarbonate block copolymer having a weight average molecular weight of from 10,000 to 200,000 and containing from 75 to 97.5 wt. % of aromatic carbonate structural units and from 25 to 2.5 wt. % of polydiorganosiloxane structural units;

(B) from 2 to 90 parts by weight of a thermoplastic, aromatic polycarbonate having a weight average molecular weight of at least 10,000, and containing bifunctional carbonate structural units corresponding to the following general formula (Ia):

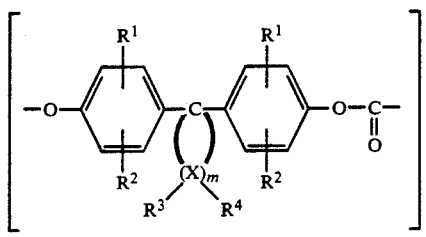

wherein

R$^1$ and R$^2$ independently represent hydrogen, halogen, C$_1$-C$_8$ alkyl, C$_5$-C$_6$ cycloalkyl, C$_6$-C$_{10}$ aryl or C$_7$-C$_{12}$ aralkyl;

m represents an integer of from 4 to 7,

R$^3$ and R$^4$, which may be selected individually for each X, independently represent hydrogen or C$_1$-C$_6$ alkyl; and x represents carbon, with the proviso that, on at least one atom X, R$^3$ and R$^4$ both represent alkyl;

and (C) from 0.5 to 30 parts by weight of a rubber having a glass transition temperature (Tg) of less than $-20°$ C.

The composition of the invention is useful for the preparation of injection molded articles having an excellent surface and a particularly good toughness at low temperatures.

DETAILED DESCRIPTION OF THE INVENTION

This invention relates to thermoplastic molding compositions comprising (A) from 10 to 98 parts, by wt., preferably from 30 to 90 parts, by wt., of polydiorganosiloxane-polycarbonate block copolymers having weight average molecular weights of from 10,000 to 200,000 and containing from 75 to 97.5 wt. % of aromatic carbonate structural units and from 25 to 2.5 wt. % of polydiorganosiloxane structural units, which have been obtained from α,ω-bishydroxyarylpolydiorganosiloxanes having a degree of polymerization (p$_n$) of from 5 to 200;

(B) from 2 to 90 parts, by wt., preferably from 10 to 70 parts, by wt., of thermoplastic, aromatic polycarbonates having weight average molecular weight of at least 10,000, preferably from 10,000 to 200,000, more preferably from 20,000 to 80,000, which contain bifunctional carbonate structural units corresponding to the following general formula (Ia):

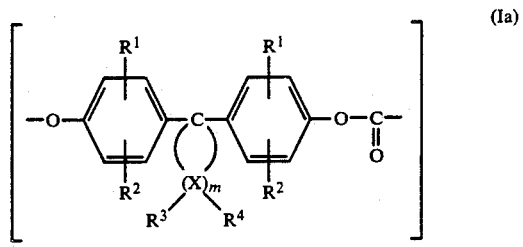

wherein

R$^1$ and R$^2$ independently represent hydrogen, halogen, C$_1$-C$_8$ alkyl, C$_5$ or C$_6$ cycloalkyl, C$_6$-C$_{10}$ aryl or C$_7$-C$_{12}$ aralkyl;

m represents an integer of from 4 to 7,

R$^3$ and R$^4$, which may be selected individually for each X, independently represent hydrogen or C$_1$-C$_6$ alkyl; and x represents carbon, with the proviso that, on at least one atom X, R$^3$ and R$^4$ both represent alkyl;

and (C) from 0.5 to 30 parts, by wt., preferably from 1 to 15 parts, by wt., of a rubber having a glass transition temperature (Tg) of less than $-20°$ C.

The polydiorganosiloxane-polycarbonate block copolymers are known in principle, e.g., from U.S. Pat. No. 3,189,662 and J. Polym. Sci. Poly. Lett. Ed., 12, 247, (1974). They contain in the polymer chain aromatic carbonate structural units (1) and polydiorganosiloxanes (2) containing aryloxy end groups:

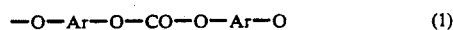

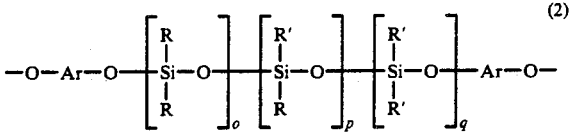

wherein

Ar represents the same or different arylene radicals derived from diphenols; and R and R', which may be the same or different, represent linear alkyl, branched alkyl, alkenyl, halogenated linear alkyl, halogenated branched alkyl, aryl or halogenated aryl, but preferably methyl, and the number of diorganosiloxy units $n = o + p + q =$ from 5 to 200, preferably from 20 to 160.

Alkyl is preferably C$_1$-C$_{20}$ alkyl, alkenyl is preferably C$_2$-C$_6$ alkenyl and aryl is preferably C$_6$-C$_{14}$ aryl "Halogenated" means partially or completely chlorinated, brominated or fluorinated. Examples of alkyl, aryl, halogenated alkyl and halogenated aryl are methyl, ethyl, propyl, n-butyl, t-butyl, vinyl, phenyl, naphthyl, chloromethyl, trifluoropropyl, perfluorobutyl, perfluorooctyl and chlorophenyl.

The preferred polydiorganosiloxane-polycarbonate block copolymers having weight average molecular weights (determined by ultracentrifugation or scattered light measurement) of from 10,000 to 200,000 and containing about 75 to 97.5 wt. % aromatic carbonate structural units and from 25 to 2.5 wt. % diorganosiloxy units may be prepared by subjecting α,ω-bis-hydroxyaryloxy-polydiorganosiloxanes to polycondensation by the two-phase interface process together with the diphenols, if appropriate also using branching agents in the customary amounts (in this context, see H. Schnell, Chemistry and Physics of Polycarbonates, Polymer Rev. vol IX, page 27 et seq., Interscience Publishers, New York, 1964), the ratio of the bifunctional phenolic reactants in each case being selected so that the content of the aromatic carbonate structural units and diorganosiloxy units resulting therefrom correspond to the above recitation in this regard.

α,ω-bishydroxyaryloxy-polydiorganosiloxanes are known e.g., from U.S. Pat. No. 3,419,634.

Diphenols which are suitable for the preparation of the α,ω-bishydroxy-aryloxy-polydiorganosiloxanes and the polydiorganosiloxane-polycarbonate block copolymers are, e.g., those corresponding to the following general formula (II):

HO—Ar—OH          (II)

wherein
Ar represents an arylene radical.
Examples include:
hydroquinone
resorcinol
dihydroxydiphenyls
bis-(hydroxyphenyl)-alkanes
bis-(hydroxyphenyl)-cycloalkanes, other than those corresponding to general formula (I), below
bis-(hydroxyphenyl) sulphides
bis-(hydroxyphenyl) ethers
bis-(hydroxyphenyl) sulphoxides
bis-(hydroxyphenyl) sulphones and
α,ω-bis-(hydroxyphenyl)-diisopropylbenzenes
and nuclear-alkylated and nuclear-halogenated compounds thereof. These and other suitable aromatic dihydroxy compounds are described, e.g., in the incorporated by reference U.S. Pat. Nos. 3,028,365 and 2,999,846 and in DE-OS 2,063,050 and 2,211,957.

Preferred diphenols are
2,2-bis-(4-hydroxyphenyl)-propane
2,2-bis-(3,5-dichloro-4-hydroxyphenyl)-propane
2,2-bis-(3,5-dibromo-4-hydroxyphenyl)-propane
2,2-bis-(3,5-dimethyl-4-hydroxyphenyl)-propane
bis-(3,5-dimethyl-4-hydroxyphenyl)-methane and
bis-(4-hydroxyphenyl) sulphide.

The diphenols may be employed individually or as mixtures.

Branching agents which may be used are compounds having three or more functional groups, in particular those having three or more phenolic hydroxyl groups, in the customary amounts of from 0.05 to 2 mol %, based on the diphenols incorporated. The preparation of branched polycarbonates is described, for example, in DE-OS 1,570,533 and 1,595,762 and in U.S. Pat. No. 3,544,514 incorporated by reference herein.

Examples of some of the compounds having three or more phenolic hydroxyl groups which may be used are 2,4-bis-(4-hydroxyphenyl-isopropyl)-phenol, 2,6-bis-(2'-hydroxy-5'-methyl-benzyl)-4-methylphenol, 2-(4-hydroxyphenyl)-2-(2,4-dihydroxyphenyl)-propane and 1,4-bis-(4,4'-dihydroxy-triphenyl-methyl)-benzene.

Some of the other trifunctional compounds are 2,4-dihydroxybenzoic acid, trimesic acid, cyanuric chloride and 3,3-bis-(4-hydroxyphenyl)-2-oxo-2,3-dihydroindole, as well as 3,3-bis-(4-hydroxy-3-methyl-phenyl)-2-oxo-2,3-dihydroindole.

Chain-terminators which may be used in the polycondensation by the two-phase interface process are aromatic compounds having one functional group, such as aromatic acid halides or phenols, in particular the phenols which are commonly used, such as, p-t-butylphenol, p-chlorophenol, 2,4,6-tribromophenol and phenol, in the customary amounts, which are determined according to the particular molecular weight to be established in the block copolymers according to the present invention. In general, chain terminators are employed in an amount of from 0.5 to 10.0 mol %, based on the diphenols employed.

Component (A) may also comprise a mixture of polydiorganosiloxane-polycarbonate block copolymers with other siloxane-free thermoplastic polycarbonates based on diphenols (II), the weight average molecular weights (as determined by ultracentrifugation or scattered light measurement) of which are from 10,000 to 200,000, the content of polydiorganosiloxane structural units in the polycarbonate mixture again being from to 2.5 wt. %, in each case based on the total weight of the polycarbonate mixture.

Those polydiorganosiloxane-polycarbonate block copolymers in which the content of polydiorganosiloxane structural units is more than 25 wt. %, preferably from 40 to 60 wt. %, and the $M_w$ may be from 15,000 to 60,000 are also suitable for the preparation of such polycarbonate mixtures.

The preparation of such polydiorganosiloxane-polycarbonate block copolymers may be carried out analogously to the preparation of those block copolymers having contents of from 25 to 2.5 wt. % of polydiorganosiloxane structural units.

Polycarbonates suitable for the present purposes are thermoplastic, aromatic polycarbonates having weight average molecular weights of at least 10,000, preferably from 10,000 to 200,000, more preferably from 20,000 to 80,000, which contain bifunctional carbonate structural units corresponding to the formula (Ia)

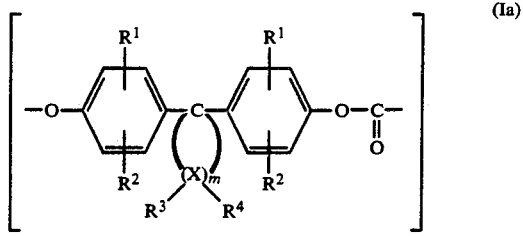

wherein
$R^1$ and $R^2$ independently represent hydrogen, halogen, $C_1$–$C_8$ alkyl, $C_5$ or $C_6$ cycloalkyl, $C_6$–$C_{10}$ aryl or $C_7$–$C_{12}$ aralkyl,
m represents an integer of from 4 to 7;
$R^3$ and $R^4$, which are selected individually for each X, independently represent hydrogen or $C_1$–$C_6$ alkyl; and
X represents carbon; with the proviso that on at least one atom X, $R^3$ and $R^4$ both represent alkyl.

The preferred alkyl radical is methyl; the X atoms in the α-position relative to the diphenyl-substituted carbon atom (C-1) are preferably not substituted by alkyl, and, in contrast, alkyl disubstitution in the β-position relative to C-1 is preferred.

These polycarbonates are obtained from bisphenols corresponding to the following general formula (I)

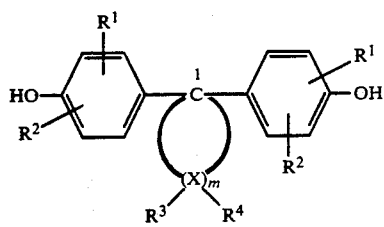
(I)

wherein
$R^1$ to $R^4$, X and m are as defined above. Diphenols (I) are, in particular, dihydroxydiphenylcycloalkanes having 5 or 6 ring carbon atoms in the cycloaliphatic radical (m=4, or 5 in (I)), such as the following diphenols;

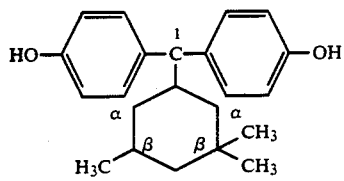

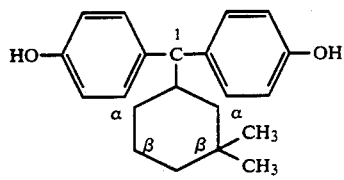

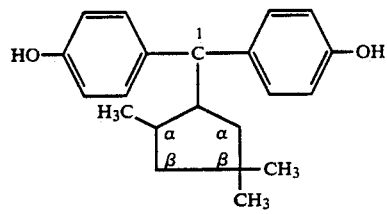

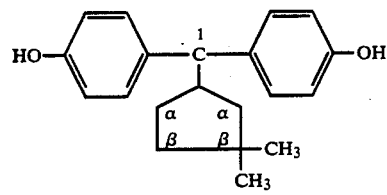

Others which may be mentioned are 1,1-bis-(4-hydroxyphenyl)-4-t-butylcyclohexane and 1,1-bis-(4-hydroxyphenyl)-3,3-dimethylcyclopentane.

Diphenols (I) may be prepared in a known manner by condensation of phenols corresponding to the following general formula (V)

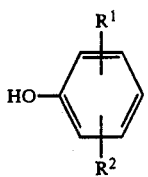
(V)

and ketones corresponding to the following general formula (VI):

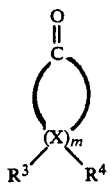
(VI)

wherein X, $R^1$, $R^2$, $R^3$, $R^4$ and m are as defined in connection with general formula (I). They are described in German Patent Application P 38 32 396.6.

In addition, diphenols (II) may also be co-condensed.

The polycarbonates (B) may be prepared by two-phase interface polycondensation with phosgene, it being possible also to use, as chain-terminators, phenol and/or monoalkylphenols and/or dialkylphenols having a total of from 1 to 20 carbon atoms in the alkyl substituents, preferably the following:

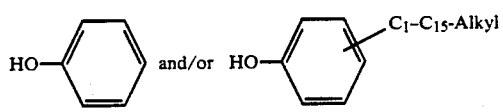

preferably in amounts of from 1.0 to 10 mol %, based on the diphenols employed.

Rubbers (C) include copolymers, in particular graft copolymers, having rubber-elastic properties which are essentially obtainable from at least two of the following monomers: chloroprene, butadiene, isoprene, isobutene, styrene, acrylonitrile, ethylene, propylene, vinyl acetate, (meth)acrylic acid esters having from 1 to 18 carbon atoms in the alcohol component and carbon monoxide, that is to say polymers such as are described, e.g., in "Methoden der organischen Chemie", (Houben-Weyl), vol. 14/1, Georg Thieme-Verlag, Stuttgart 1961, p. 393-406, and in C. B. Bucknall, "Toughened Plastics", Appl. Science Publishers, London, 1977. Preferred rubbers (C) have a gel content of more than 20, preferably more than 40, wt. %. Preferred rubbers (C) are ethylene/vinyl acetate copolymers containing from 15 to 70 wt. % of vinyl acetate and having melt indices from non-flowing to 1,000, preferably from 0.1 to 20, measured at 190° C. under a 2.16 kp load in accordance with DIN 53 753; terpolymers of ethylene, alkyl acrylates or vinyl acetate and carbon monoxide; and EPM and EPDM rubbers in which the weight ratio of ethylene to propylene radicals is from 40:60 to 90:10, preferably from 40:60 to 65:35.

The Mooney viscosities (ML 1+4/100° C. according to DIN 53 523) of the non-crosslinked EPM and EPDM rubbers are from 25 to 100 MU, preferably from 35 to 90 MU. The gel contents of the non-crosslinked EPM and EPDM rubbers are below 1 wt. %.

The ethylene/propylene copolymers (EPM) used have practically no double bonds, while the ethylene/propylene/diene terpolymers (EPDM) may contain from 1 to 20 double bonds/1,000 carbon atoms. Examples of suitable diene monomers for the EPDM are conjugated dienes, e.g. isoprene and butadiene, non-conjugated dienes having from 5 to 25 carbon atoms, e.g. 1,4-pentadiene, 1,4-hexadiene, 1,5-hexadiene, 2,5-dimethyl-1,5-hexadiene and 1,4-octadiene, cyclic dienes, e.g. cyclopentadiene, cyclohexadiene, cyclooctadiene and dicyclopentadiene, alkenyl norbornenes, e.g. 5-ethylidene-2-norbornene, 5-butylidene-2-norbornene, 2-methallyl-5-norbornene and 2-isopropenyl-5-norbornene, and tricyclodienes, e.g. 3-methyltricyclo-(5.2.1.0.2.6)-3,8-decadiene. Preferred are the non-conjugated dienes hexa-1,5-diene, ethylidene norbornene or dicyclopentadiene. The diene content in the EPDM is preferably from 0.5 to 10 wt. %.

EPM and EPDM rubbers are described, e.g., in DE-OS 2,808,709.

EPM and EPDM rubbers having grafted-on reactive groups, such as MSA, are particularly preferred.

Preferred rubbers (C) include selectively hydrogenated linear, regular or radial tele-block copolymers of a polymerized vinyl aromatic compound $(X)_n$ and $(X)'_n$ and an olefinic elastomer (Y) of the $X_n$-Y-$X'_n$-; $X_n$(Y-X-Y)$_n$-X$_n$-; $X_n$(YX)$_n$Y-; Y-$(X)_s$-; $(X)_s$-Y or Y[(XY)$_n$Y]$_s$- type (where s=3–5), wherein n represents an integer of from 1 to 10.

These block copolymers may be prepared by known processes. Before the hydrogenation, the end blocks of these copolymers comprise homopolymers or copolymers which have preferably been prepared from alkenyl aromatic hydrocarbons, and in particular vinyl aromatic hydrocarbons, wherein the aromatic content is either monocyclic or polycyclic.

Typical monomers include styrene, α-methyl styrene, vinyl toluene, ethyl vinyl xylene and vinyl naphthalene, in particular styrene or mixtures thereof. The end blocks $(X)_n$ and $(X)'_n$ may be the same or different. The central block (Y) may be derived, for example, from butadiene, isoprene, 1,3-pentadiene and 2,3-dimethyl butadiene, and it may have a linear, regular or teleradial structure.

The ratio of the copolymers and the average molecular weights may vary within wide limits, although the molecular weight of the central block should be greater than that of the combined end blocks. Preferably, the end blocks X have an average molecular weight of from 2,000 to 100,000 and the central block Y contains, for example, a hydrogenated polybutadiene block having an average molecular weight of from 25,000 to 1,000,000.

The selective hydrogenation may be carried out by known routes and means that the ethylenic double bonds are essentially completely hydrogenated, the aromatic double bonds remaining essentially uninfluenced. Such selectively hydrogenated block polymers are described, e.g., in DE-OS 3,000,282 and 2,839,356.

Preferred rubbers (C) also include polybutadienes grafted with styrene, acrylonitrile, acrylic acid esters, methacrylic acid esters or mixtures thereof, butadiene/styrene copolymers and poly(meth)acrylic acid esters, e.g. copolymers of styrene or alkyl styrene and conjugated dienes (toughened polystyrene), i.e. copolymers of the type described in U.S. Pat. No. 3,564,077), polybutadienes grafted with acrylic or methacrylic acid esters, vinyl acetate, acrylonitrile, styrene and/or alkyl styrenes, butadiene/styrene or butadiene/acrylonitrile copolymers, polyisobutenes or polyisoprenes, such as are described, e.g., in U.S. Pat. No. 3,919,353.

Particularly preferred rubbers (C) are graft products which are obtainable by polymerization of from 10 to 40, preferably from 10 to 35, more preferably from 10 to 25, wt. %, based on the graft product, of an acrylic acid ester or methacrylic acid ester or of a mixture of from 10 to 35, preferably from 20 to 35, wt. %, based on the mixture, of acrylonitrile and from 65 to 90, preferably from 65 to 80, wt. %, based on the mixture, of styrene (grafted-on portion) in the presence of from 60 to 90, preferably from 65 to 90, more preferably from 75 to 85, wt. %, based on the graft product, of a butadiene polymer containing at least 70 wt. %. based on the butadiene polymer, of butadiene radicals (graft base) wherein, preferably, the gel content of the graft base is ≧70% (measured in toluene), the degree of grafting (g) is from 0.15 to 0.55 and the average particle diameter $d_{50}$ of the graft polymer is from 0.2 to 0.6, preferably from 0.3 to 0.5, μm.

Suitable acrylic acid esters and methacrylic acid esters are the $C_1$–$C_{18}$ alkyl esters.

In addition to butadiene radicals, the graft base may contain up to 30 wt. % radicals of other ethylenically unsaturated monomers, such as styrene, acrylonitrile and $C_1$–$C_{18}$ alkyl esters of acrylic or methacrylic acid (such as methyl acrylate, ethyl acrylate, methyl methacrylate or ethyl methacrylate). The preferred graft base is polybutadiene.

Since the monomers are not completely grafted onto the graft base in the grafting polymerization, the graft products also contain homo- and co-polymers of the grafting monomers employed, in addition to the actual graft polymers.

The average particle diameter $d_{50}$ is the diameter above and below which in each case 50 wt. % of the particles lie. It may be determined using an ultracentrifuge (kolloid z. and z. Polymere, 250, (1972), 782 to 796) or by counting the particles in an electron microscope photograph (Angew. Makromolekulare Chemie 14. (1970), 111 to 129) or from light scattering.

Particularly preferred rubbers (C) are graft products of from 25 to 98 wt. %, based on (C), of acrylate rubber having a glass transition temperature below −20° C. as the graft base; and from 2 to 75 wt. %, based on (C) of a polymerizable ethylenically unsaturated monomer or of a mixture of such monomers, the homo- or copolymer of which has a glass transition temperature above 25° C., as the grafted-on portion.

Acrylate rubbers which are suitable as the graft base are, preferably, polymers of alkyl acrylates, optionally with up to 40 wt. % of other polymerizable ethylenically unsaturated monomers. If these acrylate rubbers, as described below, in turn are already graft products with a diene rubber core, the diene rubber core is not included in the calculation of the amount thereof. Preferred acrylic acid esters include $C_1$–$C_8$ alkyl esters, for example the methyl, ethyl, butyl, octyl and 2-ethylhexyl esters, halogenoalkyl esters, preferably halogeno $C_1$–$C_8$ alkyl esters, such as chloroethyl acrylate, and aromatic esters, such as benzyl acrylate and phenethyl acrylate. They may be employed individually or as a mixture.

The acrylate rubbers may be non-crosslinked or crosslinked, preferably partially crosslinked.

For the crosslinking, monomers containing more than one polymerizable double bond may be copolymerized.

Examples of crosslinking monomers are esters of unsaturated monocarboxylic acids having from 3 to 8 carbon atoms and unsaturated monohydric alcohols having from 3 to 12 carbon atoms or saturated polyols having from 2 to 4 OH groups and from 2 to 20 carbon atoms, e.g. ethylene glycol dimethacrylate and allyl methacrylate; polyunsaturated heterocyclic compounds, e.g. trivinyl and triallyl cyanurate and isocyanurate, and trisacryloyl-s-triazines, in particular triallyl cyanurate; polyfunctional vinyl compounds, such as di- and trivinylbenzene; and triallyl phosphate and diallyl phthalate.

Preferred crosslinking monomers are allyl methacrylate, ethylene glycol dimethacrylate, diallyl phthalate and heterocyclic compounds which contain at least three ethylenically unsaturated groups.

Particularly preferred crosslinking monomers are triallyl cyanurate, triallyl isocyanurate, trivinyl cyanurate, triacryloylhexahydro-s-triazine and triallylbenzenes.

The amount of crosslinking monomers is preferably from 0.02 to 5, more preferably 0.05 to 2, wt. %, based on the acrylate rubber.

Preferably not more than 1 wt. %, based on the acrylate rubber, of cyclic crosslinking monomers having at least three ethylenically unsaturated groups is used.

Preferred polymerizable ethylenically unsaturated monomers which may be used, in addition to the acrylic acid esters, for the preparation of the acrylate rubbers are, e.g. acrylonitrile, styrene, α-methylstyrene, acrylamides, vinyl $C_1$-$C_6$ alkyl ethers, butadiene and isoprene.

Preferred acrylate rubbers are emulsion polymers which have a gel content of 60 wt. % (measured at 25° C. in dimethylformamide).

Acrylate rubbers may also have a core/shell structure, i.e. contain a crosslinked diene rubber of one or more conjugated dienes, such as polybutadiene, or a copolymer of a conjugated diene with an ethylenically unsaturated monomer, such as styrene and/or acrylonitrile, as the core.

The weight content of acrylate rubber in this polydiene core may be from 0.1 to 80, preferably from 10 to 50, wt. %. The shell and core may independently of one another be non-crosslinked, partially crosslinked or highly crosslinked.

The grafting yield, i.e. the quotient of the amount of graft polymerized monomer and the amount of monomer employed, is as a rule from 0.2 to 0.8.

Preferred grafting monomers are α-methylstyrene, styrene acrylonitrile, methyl methacrylate or mixtures of these monomers. Preferred grafting monomer mixtures are those of styrene and acrylonitrile in a weight ratio of from 90:10 to 50:50.

Graft products (C) based on polyacrylic acid esters are described, e.g., in DE-AS 2,444,584 and in DE-OS 2,726,256.

Particularly advantageous graft products of this type are obtained if from 2 to 20, preferably from 2 to 15, wt. %, based on (C), of monomer is grafted onto from 80 to 98, preferably from 85 to 97, wt. %, based on (C), of the completely broken rubber latex, suspended in water, in the absence of a suspending agent. The pulverulent graft polymer obtained may then be dried and homogenized with the other components in the desired ratio under the action of shearing forces such that the average particle diameter $d_{50}$ of component (C) in the mixture according to the present invention is from 0.05 to 3, preferably from 0.1 to 2, more preferably from 0.2 to 1, μm.

The expression "in the absence of a suspending agent" means the absence of substances which, according to the nature and amount thereof, could suspend the grafting monomers in the aqueous phase. The definition does not exclude the presence of substances which have a suspending action, e.g. in the preparation of a grafted graft base, and in such cases the coagulating or precipitating agent employed to break the rubber latex must be added in an amount which compensates the suspending action of the substances used in the prior stage; in other words: it must be ensured that the grafting monomers do not form a (stable) emulsion of dispersion in the aqueous phase.

A graft product (C) prepared in this way in the absence of a suspending agent may be distributed in the molding compositions according to the present invention with an exceptionally low particle size, which also survives relatively long processing times at a relatively high temperature in relatively unchanged form.

Acrylate rubbers in the form of a latex, onto the latex particles of which from 1 to 20 wt %. preferably from 1 to 10 wt. %, of those monomers, the homo- or copolymers of which have a glass transition temperature >0° C., have already been graft polymerized in the aqueous emulsion, may also be used as the graft base. Preferred monomers are alkyl acrylates, alkyl methacrylates, styrene, acrylonitrile, α-methyl-styrene and/or vinyl acetate.

Such graft bases may also be obtained by preparing an acrylate rubber by solution or bulk polymerization, subsequently graft-polymerizing the monomers and then converting the rubber into an aqueous emulsion. Graft polymers prepared in aqueous emulsion with such acrylic acid ester polymers or copolymers as the base and containing a diene rubber core are also suitable graft bases.

Up to 5 wt. %, based on the mixture, of ethylene homo- or copolymers may additionally be added further to increase the resistance of the present compositions to gasoline. Suitable ethylene copolymers are polyethylenes which, in addition to ethylene radicals, contain up to 30 wt. %, in each case based on the ethylene copolymer, of radicals of other copolymerizable monomers, such as acrylic acid or methacrylic acid.

The compositions according to the present invention may contain the customary additives for polycarbonates and for rubbers, such as lubricants and mold release agents, nucleating agents, stabilizers, fillers and reinforcing substances, flameproofing agents and dyestuffs. The filled or reinforced compositions may contain up to 30 wt. %, based on the reinforced molding composition, of fillers and/or reinforcing substances. Preferred reinforcing substances are glass fibers. Preferred fillers, which may also have a reinforcing effect, are glass beads, mica, silicates, quartz, talc, titanium oxide and wollastonite. The compositions which have been treated with flame-proofing agents may contain them in an amount of up to 30%, based on the weight of the flameproofed molding compositions. All the flameproofing agents known for polycarbonates are suitable. The compositions may be prepared in the customary mixing units, such as mills, kneaders and single- and multi-screw extruders. In most cases, (A) (B) and (C) are mixed in one step. It is also possible to omit one component and to admix this component at a later point in time.

The molding compositions of the invention have a particularly good toughness at low temperatures and give injection-molded shaped articles having excellent surfaces.

The invention is further illustrated but is not intended to be limited by the following examples in which all parts and percentages are by weight unless otherwise specified. All the percentages given in the following examples are percentages by weight.

EXAMPLES

The following polymers were used for the examples described:

(A) A copolycarbonate based on a bisphenol A and 6.7 wt. % polydimethylsiloxane of block length ($p_n$) 80, having a relative viscosity of 1.28 (measured in methylene chloride at 25° C.).

A copolycarbonate based on a bisphenol A and 5.3 wt. % polydimethylsiloxane of block length ($p_n$) 80, having a relative viscosity of 1.28 (measured in methylene chloride at 25° C.), was employed in Example 4 (comparison).

(B) A copolycarbonate based on 2,2-(4-hydroxyphenyl)propane and 1,1-bis-(4-hydroxyphenyl)-3,3,5-trimethylcyclo-hexane in the molar ratios of 45:55 (Ex. 1), 65:35 (Ex. 2, 5–9) and 80:20 (Ex. 3) and a relative viscosity of 1.31, 1.31 and 1.30 (measured in methylene chloride at 25° C.).

(C) A rubber-elastic polymer based on hydrogenated SEBS from shell (Kraton G 1651) (Ex. 1–4). Modified EPDM rubbers, from Exxon were employed in Examples 5–8 (Exxelor VA 1803 Ex. 5 and 6; Exxelor VA 0043 Ex. 7 and 8). A graft polymer of 80 wt. % graft base of crosslinked polybutadiene (gel content above 70 wt. %, measured in toluene) and 20 wt. % grafted-on portion of methyl methacrylate, the average particle diameter of the graft base, present in latex form, being from 0.3 to 0.4 μm, was employed in Example 9.

The compositions were prepared using conventional apparatus and processed on an injection molding machine.

The notched impact strength was determined on flat bars (80 mm×10 mm×4 mm) in accordance with ISO 180-IA; the heat distortion point was determined by the Vicat (B) method in accordance with DIN 53 460/ISO 360.

TABLE 1

| Composition | units | Example 1 | Example 2 | Example 3 | Example 4 (Comparison) |
|---|---|---|---|---|---|
| Component (A) | % | 78 | 66.6 | 43 | 98 |
| Component (B) | % | 20 | 31.4 | 55 | |
| Component (C) | % | 2 | 2 | 2 | 2 |
| Notched impact strength | | | | | |
| at 23° C. | kJ/m$^2$ | 61.9 | 63.0 | 67.0 | 83 |
| at −20° C. | kJ/m$^2$ | 52.8 | 52.8 | 53.0 | — |
| at −30° C. | kJ/m$^2$ | — | 50.5 | 39.1 | — |
| at −40° C. | kJ/m$^2$ | 42.9 | 4 × 42.5<br>6 × 35.6 | 30.3 | 71 |
| at −50° C. | kJ/m$^2$ | 30.2 | 29.8 | — | 6 × 71<br>4 × 52 |
| at −60° C. | kJ/m$^2$ | 25.9 | — | — | 44 |
| Vicat (B) | °C. | 159 | 163 | 163 | 145 |
| Melt viscosity 300° C. | | | | | |
| at 100 s$^{-1}$ | Pa.s | 685 | 726 | 735 | 740 |
| at 1000 s$^{-1}$ | Pa.s | 332 | 344 | 376 | 383 |
| at 1500 s$^{-1}$ | Pa.s | 260 | 265 | 272 | 274 |

TABLE 2

| Composition | Units | Example 5 | Example 6 | Example 7 | Example 8 | Example 9 |
|---|---|---|---|---|---|---|
| Component (A) | % | 70 | 68 | 70 | 68 | 67 |
| Component (B) | % | 28 | 38 | 28 | 28 | 28 |
| Component (C) | % | 2 | 4 | 2 | 4 | 5 |
| Notched impact strength | | | | | | |
| at 23° C. | kJ/m$^2$ | 63.5 | 61.9 | 61.6 | 61.9 | 59.4 |
| at −20° C. | kJ/m$^2$ | 52.2 | 55.3 | 51.8 | 57.1 | 49.5 |
| at −30° C. | kJ/m$^2$ | — | — | — | — | — |
| at −40° C. | kJ/m$^2$ | 8 × 45.8<br>2 × 35.9 | 52.4 | 47.0 | 55.3 | 46.2 |
| at −50° C. | kJ/m$^2$ | 29.3 | 33.0 | 34.2 | 3 × 43.0<br>7 × 36.8 | 39.3 |
| at −60° C. | kJ/m$^2$ | 22.2 | — | 24.9 | 35.5 | |
| Vicat (B) | °C. | 155.5 | 156 | 156 | 155 | 154.5 |
| Melt viscosity 270° C. | | | | | | |
| at 100 s$^{-1}$ | Pa.s | — | 1573.2 | 1845.3 | 1519.1 | 2225.4 |
| at 1000 s$^{-1}$ | Pa.s | — | 594.0 | 693.3 | 508.3 | 768.9 |
| at 1500 s$^{-1}$ | Pa.s | — | 463.3 | 527.3 | 437.0 | — |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising:

(A) from 20 to 98 parts by weight of a polydiorganosiloxane-polycarbonate block copolymer having a weight average molecular weight of from 10,000 to 200,000 and containing from 75 to 97.5 weight percent of aromatic carbonate structural units and from 25 to 2.5 weight percent of polydiorganosiloxane structural units;

(B) from 2 to 90 parts by weight of a thermoplastic, aromatic polycarbonate having a weight average molecular weight of at least 10,000 and containing bifunctional carbonate structural units corresponding to the formula

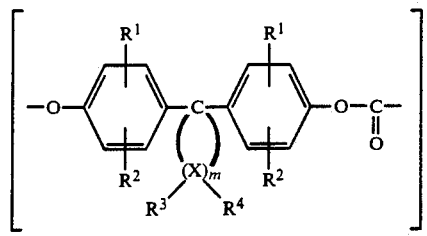

wherein
$R^1$ and $R^2$ independently represent hydrogen, halogen, $C_1$-$C_8$ alkyl, $C_5$-$C_6$ cycloalkyl, $C_6$-$C_{10}$ aryl, or $C_7$-$C_{12}$ aralkyl;
m represents an integer of from 4 to 7;
$R^3$ and $R^4$ are selected individually for each X and independently represent hydrogen or $C_1$-$C_6$ alkyl; and
X represents carbon;
with the proviso that, on at least one atom X, both $R^3$ and $R^4$ represent $C_1$-$C_6$ alkyl;
and
(C) from 0.5 to 30 parts by weight of a rubber having a glass transition temperature of less than $-20°$ C., wherein said rubber is a copolymer having rubber-elastic properties obtained from at least two monomers selected from the group consisting of chloroprene, butadiene, isoprene, isobutene, styrene, acrylonitrile, ethylene, propylene, vinyl acetate, (meth)acrylic acid esters, and carbon monoxide.

* * * * *